United States Patent [19]
Limiero et al.

[11] 3,978,294
[45] Aug. 31, 1976

[54] RETURN ANSWER-SUPERVISORY CIRCUIT

[75] Inventors: Albert David Limiero, Longmont; Edwin Walter Lipien, Boulder, both of Colo.

[73] Assignees: Western Electric Company, New York, N.Y.; Bell Telephone Laboratories, Incorporated, Murray Hill, N.J.

[22] Filed: June 16, 1975

[21] Appl. No.: 587,060

[52] U.S. Cl.......................... 179/27 CA; 179/18 AH
[51] Int. Cl.²............................................ H04M 7/06
[58] Field of Search .................................. 179/27 CA

[56] References Cited
UNITED STATES PATENTS

| | | | |
|---|---|---|---|
| 2,827,517 | 3/1958 | Armstrong | 179/27 CA |
| 2,841,653 | 7/1958 | Pharis | 179/27 CA |
| 2,915,591 | 12/1959 | Pedrick | 179/27 C |
| 3,549,817 | 12/1970 | Peady | 179/42 |

OTHER PUBLICATIONS

War Department Technical Manual TM 11–335, Telephone Central Office Set TC–1, 15 Apr., 1942 pp. 39–43.

Proc. of 1970 International Conf. on Communications: "Solid State Miniature Tie Trunk Circuit" by R. R. Maxon pp. 43–47 thru 43–16, 1970.

*Primary Examiner*—William C. Cooper
*Attorney, Agent, or Firm*—D. M. Duft

[57] ABSTRACT

A PBX system is disclosed having a return answer supervisory circuit in a local PBX for automatically detecting and extending an answer indication from a called station located in a distant PBX to an attendant's console in the local PBX on tie trunk calls between the local and distant PBXs. The disclosed system is an improvement in the art in that it does not require major modification to existing equipment for returning the answer indication to the attendant's console.

13 Claims, 3 Drawing Figures

RETURN ANSWER-SUPERVISORY CIRCUIT

BACKGROUND OF THE INVENTION

1. Field of the Invention

This invention relates to a telephone system and, in particular, to a private branch exchange (PBX) system having equipment for automatically providing return answer supervision on tie trunk calls between two PBXs.

2. Description of the Prior Art

It is common practice to provide supervisory circuits of various types and configurations in PBX systems in order to implement useful and valuable customer services and features. One such particular feature is desired when a call to a local PBX requests a station located in a distant PBX. An attendant located at the local PBX receives the call on an incoming central office trunk and then transfers the call over a tie trunk to the distant PBX.

Prior art arrangements provide a return supervisory indication to the attendant when the common control of the local PBX establishes a network connection between the calling central office trunk and an idle tie trunk. This return supervisory indication activates a previously unlit lamp on the attendant's console to indicate that the network connection is made and that the calling line is transferred to an idle tie trunk. If the lamp remained unlit, the attendant could further service the calling party in the event, for example, the tie trunks are all busy.

Although prior art arrangements operate satisfactorily to provide supervision to the point of the network connection, the call is denied attendant supervision on tie trunk calls after the tie trunk is seized. For example, when the called party does not answer, in prior art arrangements, the calling party must place a second call to the local PBX attendant if the calling party desires further service.

BRIEF SUMMARY OF THE INVENTION

It is, therefore, an object of the invention to provide improved supervisory return indications on tie trunk calls in a private branch exchange system.

It is a further object to provide a return answer supervisory circuit that is adaptable to prior art arrangements with a minimum of cost and complexity.

SUMMARY DESCRIPTION

Prior art supervisory arrangements for tie trunk calls between local and distant PBXs are less than ideal since they provide the attendant with only an indication of whether or not the tie trunk is connected by the network to the calling central office trunk of the local PBX. Thus, calling stations incoming to the local PBX over central office trunks are denied attendant supervision after the tie trunks are connected. This includes the time required for the calls to be processed by the distant PBX.

We provide a return answer supervisory circuit for central office trunk calls which require a minimum of modification to an existing prior art arrangement in order to provide the valuable feature of attendant supervision for the calling station until the called station answers.

Our invention is disclosed as embodied in a local PBX having tie trunks over which calls may be transferred to a distant PBX. An incoming call over a central office trunk to the local PBX desiring a station located in the distant PBX is directed to the attendant's console. The attendant answers the call, determines the directory number of the called station, and dials the called station's number into the common control of the local PBX. The common control selects an idle tie trunk, establishes a network connection between the calling central office trunk and the tie trunk in the local PBX, and outpulses the called station's number to the distant PBX. The distant PBX receives the called station's number over the tie trunk and provides ringing current to the called station.

In accordance with our invention, a return answer supervisory circuit delivers a flashing signal indication to a lamp located in the attendant's console commencing with the completion of the network connection between the tie trunk and the central office trunk and lasting until the called station answers at which time the signal indication changes to a steady illumination. In the event that the called station does not answer, the attendant, noticing that the lamp is still flashing, can effect a connection into the calling central office trunk and determine if the calling party requires further service.

FEATURES

One feature of the present invention is to provide return answer supervision in a local PBX for signaling an attendant when a called party located in a distant PBX answers a call directed over a tie trunk from the local PBX.

Another feature of the present invention is to provide return answer supervision for tie trunk calls between a local PBX and a distant PBX by providing a first signal to the attendant when the call is extended by the local PBX to the distant PBX, and a second signal to the attendant when the called party at the distant PBX answers.

A further feature of the present invention is the provision of a shunt path across a relay used for detecting the network connection of a tie trunk call thereby preventing the relay from operating a signal lamp on the attendant's console and the provision of an additional current source which is applied to the relay when the called party in a distant PBX answers the tie trunk call causing the relay to operate the signal lamp.

DRAWING

These and other objects and features of the invention will become more apparent upon a reading of the following description thereof taken in conjunction with the drawing in which:

FIG. 1 discloses a block diagram of a private branch exchange system and associated apparatus for returning answer supervision configured in accordance with one illustrated embodiment of our invention;

FIG. 2 illustrates a prior art arrangement of returning supervision in the local PBX upon the completion of the network connection for a tie trunk call and a prior art arrangement for detecting an answer signal by the called station; and FIG. 3 discloses modifications, in accordance with this one illustrative embodiment of our invention, to the prior art arrangements of FIG. 2 to provide return answer supervision for a tie trunk call.

GENERAL DESCRIPTION

FIG. 1 is a block diagram depicting a telephone system having a central office 14, a local PBX 20 with an attendant's console 40, and a distant PBX 50.

In an effort to simplify the description as much as possible consistent with the full disclosure of our invention, only two telephone stations 10 and 60 are illustrated. Moreover, only a single central office trunk 16, a single tie trunk 54, and a single attendant's console 40 are shown. However, in an actual telephone switching system, a plurality of such trunks, consoles and distant PBXs would be utilized to service a plurality of such telephone stations. For example, a typical telephone system of the present invention may comprise thirty to forty central office trunks and one to three attendant's consoles in the local PBX, five to ten tie trunks to a distant PBX, and one to three distant PBXs.

The operation of the depicted telephone switching system in FIG. 1 is described only to the extent that a full understanding of our invention can be realized. For a more comprehensive understanding of tie trunk calls between local and distant PBXs, reference can be made to "Solid State Miniature Tie Trunk Circuit," (sic) R. R. Maxon, Proceedings, 1970 International Conference on Communications, pg. 43–7 to 43–20.

As is well known in the telephone art, a calling station 10 over tip and ring leads 12 can gain access through central office 14 and over a central office trunk 16 to a local PBX 20. If the calling station 10 desires connection to a called station 60 at a distant PBX, the common control 28 of the local PBX 20 effects an interconnection between the tip and ring leads of the central office trunk 16 with the tip and ring leads of an idle tie trunk 54 in a conventional manner which will be more fully discussed in the following. In a manner well-known in telephony art, the distant PBX 50 interconnects the calling station 10 now appearing on the tip and ring leads of the tie trunk 54 with the tip and ring leads 56 of the called station 60.

The interconnection in the local PBX 20 of a conventional central office trunk 16, with the tie trunk 54 occurs in the following manner. The central office trunk circuit 18 interconnects the tip and ring leads of the central office trunk 16 with the tip and ring leads of leads 38. As will be more fully discussed, the sleeve lead S of leads 38 provides a convenient electrical path for a variety of supervisory signals including those of the present invention.

The tip, ring and sleeve leads 38 appear on the switching network 22 which may comprise a conventional crossbar switch as disclosed, for example, in "Basic Telephone Switching Systems," Pages 104–107, by David Talley (Hayden, 1969). The network 22 establishes, under attendant control, a path from the tip, ring and sleeve leads 38 to the tip, ring and sleeve leads 35 which input into a conventional tie trunk interface circuit 24.

The interface circuit 24 interconnects the ring, tip and sleeve leads 35 with the tip, ring and sleeve leads 39 for delivery into a conventional tie trunk circuit 26. The tie trunk circuit 26 connects the tip and ring leads of leads 39 with the tip and ring leads of the tie trunk 54.

The common control 28, in a well known fashion over control leads 30, 32 and 34, directs the establishment of tip and ring paths, T and R, from the central office trunk 16 to the tie trunk 54 and further directs the establishment of a sleeve lead path S from the central office trunk circuit 18 to the tie trunk circuit 26 as shown with dotted lines in FIG. 1. The above circuits and interconnections are conventional and concern our invention only in a manner to be subsequently described.

It is important to note that prior to the establishment of the tip, ring and sleeve paths in FIG. 1, the calling station 10 was interconnected with the attendant's console 40 over path 19, extending between the central office trunk circuit and the attendant's console 40. During the establishment of this path, the calling party on station 10 is in voice communication with an attendant at the attendant's console 40 during which time the identity of the called station 60 is determined by the attendant. The attendant, by operating the attendant's console 40 in a manner not shown in detail, signals the common control 28 over lead 42 to establish the above-described path from the central office trunk 16 to the tie trunk 54. Details of this approach are well known and they do not comprise the essence of this invention.

The attendant's console 40 provides a real time interactive control by an attendant for servicing a plurality of such tie trunk calls. For the purposes of the present invention, only one signal lamp 48 is shown in FIG. 1. Signal lamp 48 may derive its illumination power from either of two sources located in the central office trunk circuit 18: a direct current source 44 activated by closing make contacts SL-2 and a 60 indications per minute (IPM) source 46 activated through break contacts SL-1. Either power source, 44 and 46, can be delivered over lead 52 to the lamp 48 and then to ground.

In a manner to be subsequently described in detail, the prior art arrangement which provides only tie trunk supervision operates in the following manner. Before the establishment of the tip, ring and sleeve paths, as shown by dotted lines in the local PBX 20, the lamp 48 is not illuminated from any power source. When common control 28 selects an idle tie trunk circuit 26 in a conventional fashion, a relay SL, not shown in FIG. 1, is operated which closes the make contacts SL-2 thereby delivering direct current power over lead 52 to the lamp 48 from source 44 to provide the attendant with a steady illumination. This indication to the attendant conveyed the information that a tie trunk to central office trunk connection has been made by the network 22 and that the call has been routed over the tie trunk 54 to the called station 60. The attendant at this time would provide no further supervision for the tie trunk call. The prior art approach did not utilize the 60 IPM power source 46 for supervision at this time. The 60 IPM power source 46 is used, however, in prior art arrangements to indicate CAMP-ON (i.e., when a third party desires access to a first party engaged in a conversation with a second party).

In accordance with our invention and in a manner to be detailed later, we provide a 60 IPM signal to lamp 48 from source 46 by adding break contacts SL-1. This signal continues during the selection of an idle tie trunk 54, it further continues during the establishment of the tip and ring path from the central office trunk 16 to the tie trunk 54, and it further continues during the establishment of a path over the tie trunk 54, through the distant PBX 50 and to the called station 60. This 60 IPM signal for lamp 48 terminates only when the called party 60 goes off hook (i.e., answers) at which time a reverse battery signal on the tip and ring leads is delivered from the called station 60, through the distant PBX 50 and over the tie trunk 54 into the tie trunk interface circuit 24. Upon detecting the reverse battery signal in the interface circuit 24, a relay SL, not shown in FIG. 1, is operated to switch the power source for lamp 48 from source 46 to source 44 in order to provide a steady illumination for the attendant. Therefore, according to our invention, we have enabled the attendant to continue supervision of a tie-trunk call until the called party answers with only minor modification of existing circuitry.

It is therefore apparent, that our invention enables an attendant located at the attendant's console of the local PBX 20 to maintain supervision for a tie-trunk call until the called party answers. This feature provides a valuable service for calling station 10, since if the called station 60, the distant PBX 50, the tie trunk 54, or the tie trunk interface circuit 24, would fail or be busy, the attendant would notice a "no answer" condition and would be able to reconnect to the calling party to provide additional service.

DETAILED DESCRIPTION

Figure 1:
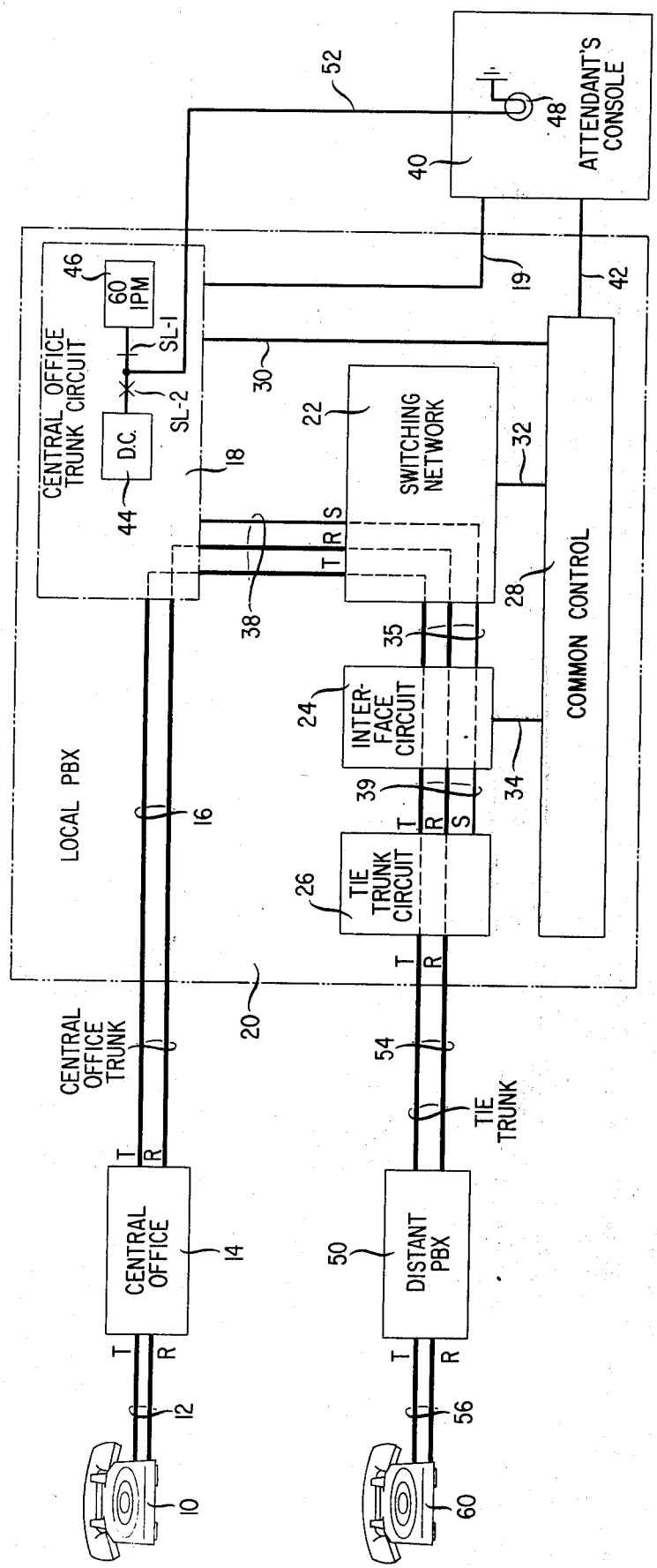
Figure 2:
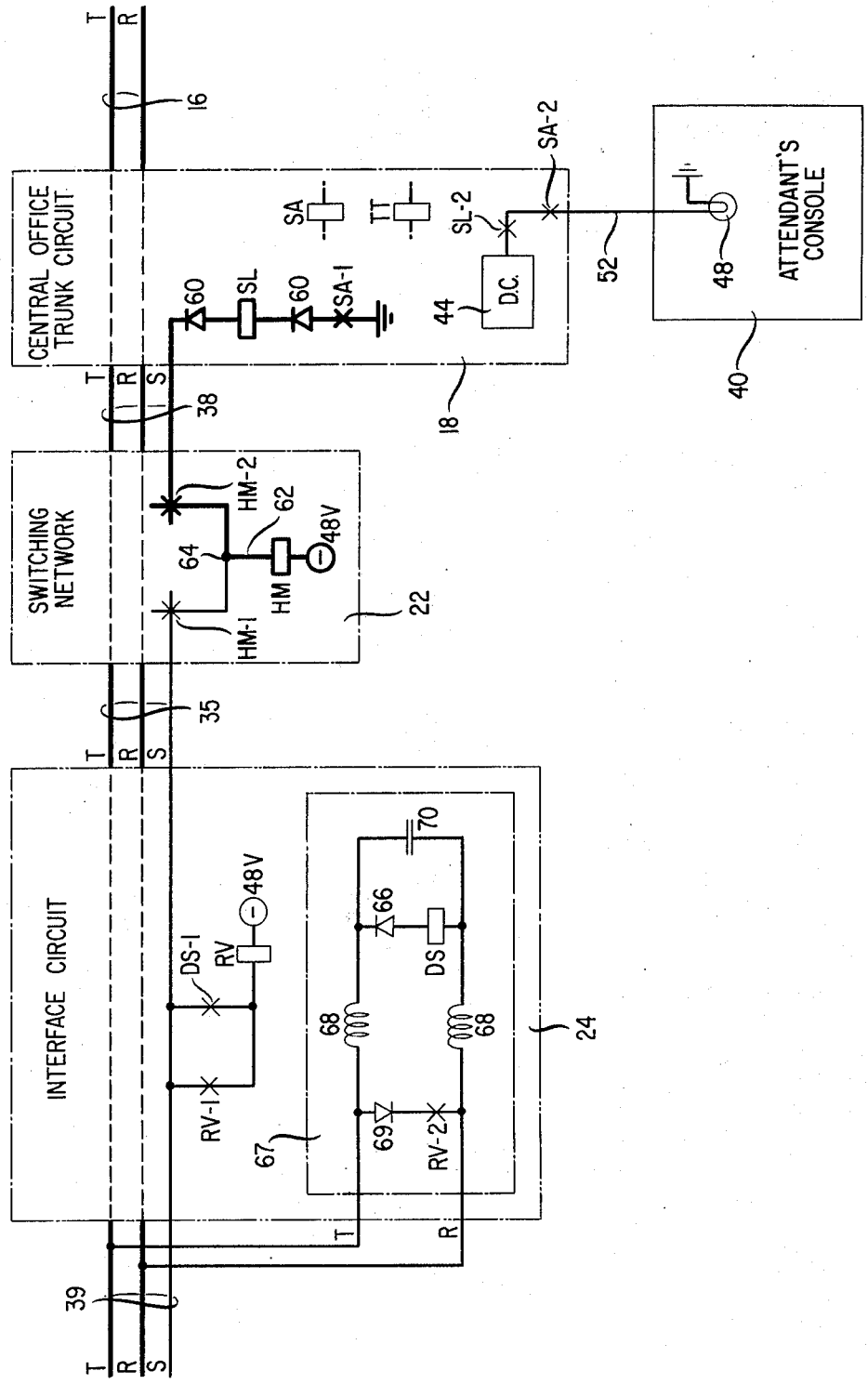

FIG. 2 shows a prior art arrangement in which network supervision is returned to the signal lamp 48 of the attendant's console 40. As previously discussed for FIG. 1, the lamp 48 is not illuminated until an idle tie trunk 54 is seized for a calling central office trunk 16 by the common control 28 in a conventional manner. Concurrent with the network connection of the tie trunk 54 to the central office trunk circuit 18, a relay SL in trunk circuit 18 is operated to connect the direct current power source 44 to the lamp 48 thereby providing the attendant a steady illumination. This steady illumination informs the attendant that a tie trunk is seized.

Figure 3:
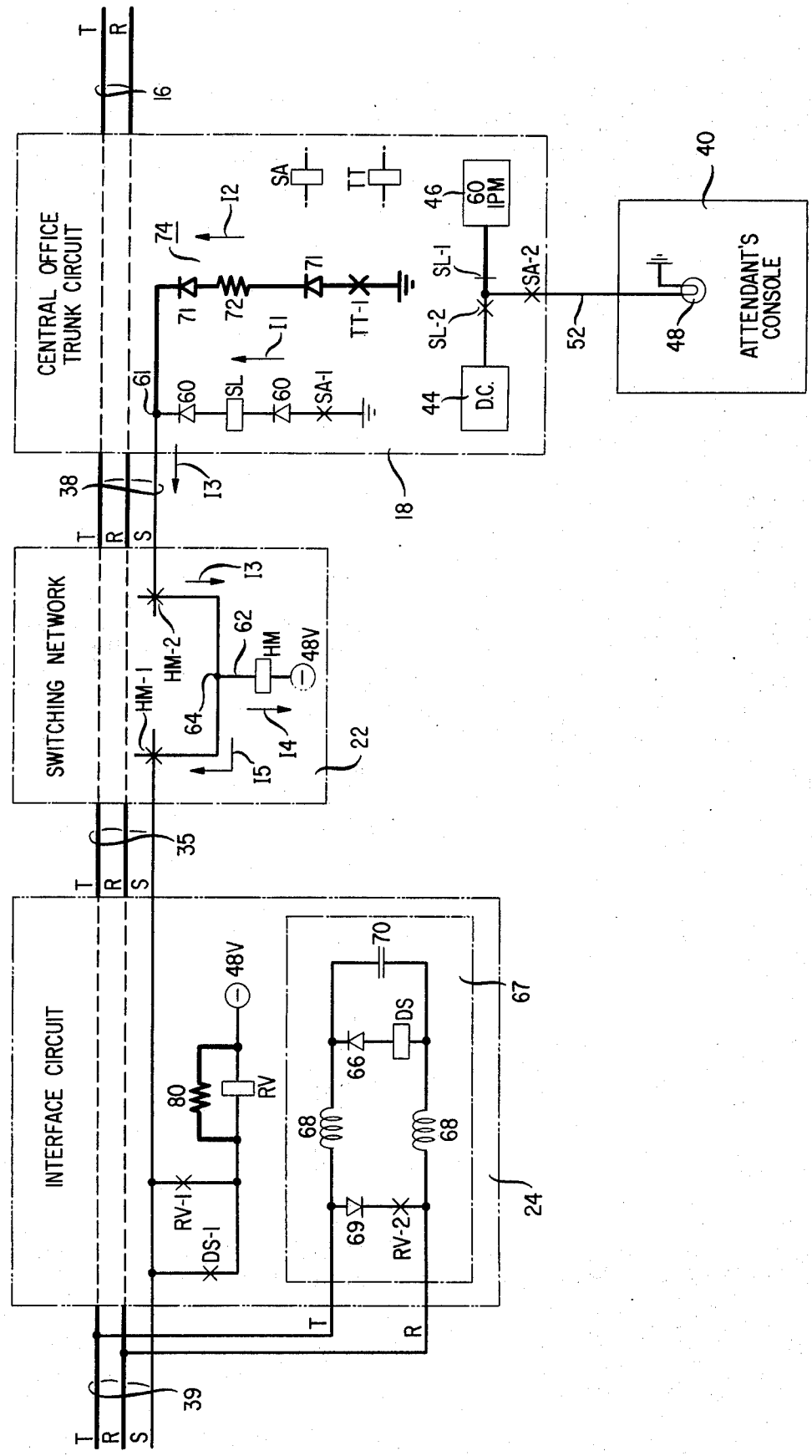

FIG. 2 illustrates only one example of prior art circuitry necessary for network supervision on tie trunk calls. The tip and ring interconnections are only shown diagramatically since their details are well known to those skilled in the art. These leads provide a conventional voice transmission path for the calling party. The prior art arrangement of FIG. 2 and our invention of FIG. 3 are both concerned only with the circuitry of the sleeve lead S which interconnects the tie trunk interface circuit 24, the switching network 22, and the two-way trunk circuit 18.

In the prior art arrangement of FIG. 2, two separate circuits are illustrated. The first circuit is shown in heavy bold lines and it involves an interconnection between the central office trunk circuit 18 and the switching network 22 on sleeve lead S. The second circuit involves an interconnection between the tie trunk interface circuit 24 and the switching network 22, and it is shown by normal width lines for sleeve lead S.

The first circuit comprises a prior art arrangement for providing network supervision for a tie trunk call. After the common control 28 of FIG. 1 selects an idle tie trunk 54 for a calling central office trunk circuit 18, the next processing step establishes a network path from trunk circuit 18 to the tie trunk circuit 26. When that network path is made for the tip and ring leads, T and R, a corresponding network connection is made for the sleeve lead S, as shown in FIG. 2.

The network connection is conventional and occurs when a ground, not shown, is applied to node 64 by the common control 28. A ground appearance at node 64 causes current to flow through the hold magnet coil HM thereby operating the hold magnet HM. Crosspoints HM-1 and HM-2 are thereby closed causing the hold magnet HM to be held by current from the ground in the central office trunk circuit 18, through closed contacts SA-1 and relay SL on sleeve lead S.

Relay SA, shown symbolically, operates to perform unrelated duties whenever a call is being served by the central office trunk circuit 18. Therefore, at the time of the network connection, make contacts SA-1 are closed and hold magnet HM is thereby held operated. When the call is ended, relay SA releases to release hold magnet HM.

Relay SL operates upon the removal of the ground at node 64 and causes make contacts SL-2 to close thereby connecting the direct current power source 44 to lamp 48. This connection, as described above, provides a steady illumination to signal lamp 48 thereby informing the attendant that a network connection has been made. Prior to the network connection, lamp 48 was not illuminated.

Relay TT in the central office trunk circuit 18 operates upon the seizure of an idle tie-trunk by the common control and such action becomes important in the implementation of our invention. However, relay TT is primarily used for other purposes in the prior art arrangement of FIG. 2 which are completely unrelated to our invention. Relay TT releases at the termination of the call.

The second circuit of the FIG. 2 becomes activated when the called station 60 goes off-hook (i.e., answers). An off-hook condition in the called station 60 reverses battery polarity on the tip and ring leads 54 of the distant PBX 50 in a conventional fashion. This battery reversal is delivered over the tip and ring leads 54 and into the interface circuit 24 where it is detected by a battery reversal indication circuit 67.

Upon a battery reversal condition on the tip and ring leads 39, relay DS operates and closes make contacts DS-1. With contacts DS-1 closed, a conducting path for sleeve lead S is provided in the following manner. The minus 48 volt potential in the interface circuit 24 is delivered through the winding of relay RV, through make contacts DS-1, over sleeve lead S of leads 35, through the closed network crosspoint connection HM-1, through the closed network crosspoint connection HM-2, over sleeve lead S of leads 38, through the relay SL winding and through make contacts SA-1 to ground. Diodes 60 provide electrical isolation for relay SL from other signals appearing on sleeve lead S which are not shown.

The establishment of this conducting path S operates relay RV which closes make contacts RV-1. Relay RV is now held operated by its own contacts RV-1. This hold path is released by the opening of contacts SA-1 when the call terminates as previously discussed.

Relay DS is now able to change state, as for example, when the called station 60 generates a flash signal (i.e., a momentary on-hook signal). However, despite the state of relay DS, relay RV remains operated. With relay RV operated for the duration of the call, make contacts RV-2 close and provide a current path through the tip and ring leads 39 via diode 69 such that during the flash indication and during the on-hook momentary condition the connection to the distant PBX 50 is maintained rather than lost. It is understood that in conventional telephony art, current must be maintained in the tip and ring path 49 to maintain the tie trunk connection.

Therefore, when the called station 60 provides a first off-hook condition, a battery reversal is detected by relay DS which operates relay RV. Relay RV remains operated for the duration of the call and relay DS is free to detect other signaling conditions of the called station 60 including that of a flash condition. With relay RV operated, contacts RV-2 are closed thereby maintaining current through the tip and ring leads for the duration of the flash by the called station 60.

FIG. 3 illustrates one embodiment of our invention which utilizes the existing circuitry of the prior art arrangement of FIG. 2 as extensively as possible. Such a design goal of minimizing hardware additions to an existing system is essential in keeping telephone system costs at a minimum in order to provide subscribers with inexpensive phone service while at the same time providing additional valuable features. These design goals are met in the present embodiment.

Additions to the existing circuitry of FIG. 2 are shown in heavy bold lines in FIG. 3 and includes a resistor 80 in parallel with the coil of relay RV in the tie trunk interface circuit 24 and the inclusion in the central office trunk circuit of a shunt path 74 which comprises two diodes 71, a resistor 72, and make contacts TT-1 of relay TT. In addition, break contacts SL-2 are provided between the 60 IPM source 46 and the lamp 48. The system operation of our invention will now be discussed.

When the common control 28, shown in FIG. 1, has seized an idle tie trunk circuit 26 in order to establish a connection for the calling station 10 appearing in the central office trunk circuit 18, relay TT is operated indicating that a tie trunk circuit is seized. Relay TT as mentioned in the previous discussion of the prior art, serves other functions which are not related to the concept of our present invention. However, when relay TT operates to indicate that a tie trunk is seized, the closure of make contacts TT-1 places the shunt path 74 across the coil of relay SL.

Therefore, when the network crosspoint connection HM-2 is made on the sleeve lead S by the common control 28, a potential source of minus 48 volts in the network 22 is delivered through the coils of the hold magnet HM, through the crosspoint connection of HM-2, over the sleeve lead path S of leads 38, and to a bifurcated electrical path comprising one branch containing the relay SL and a second branch containing the resistor 72. The summation of the current entering and leaving node 61 must equal zero so that:

$$I3 = I1 + I2.$$

However, the current I1 through the coil of the relay SL is insufficient to operate relay SL. With relay SL released, the signal lamp of FIG. 1 receives its power from the 60 IPM source 46 since break contacts SL-1 remain closed. As previously mentioned relay SA operates when the central office trunk circuit 18 serves a call for which a network connection has been established, therefore, contacts SA-2 are closed when the central office trunk circuit 18 is serving a call for which a network 22 connection has been established. At the termination of the call, contacts SA-2 release thereby preventing delivery of any power to lamp 48.

In comparison to the prior art approach of FIG. 2, our invention, as illustrated in FIG. 3, prevents the operation of relay SL by providing a shunt path 74 which reduces the current of the prior art approach through coil SL to a value below the value of current necessary to activate relay SL.

At this stage of the call, the calling station 10 has been interconnected with a tie trunk 54 in the local PBX 20. The distant PBX 50 will effect a connection from the tie trunk 54 to the called station 60 and will begin ringing the called party 60. Therefore, while the called station 60 is ringing, current I3 in the direction indicated on sleeve lead S of leads 38 enters from the Central office trunk circuit 18 into the minus 48 volt potential source of network 22. It is important to note that at this time in the progress of the call, current in the sleeve lead S of leads 35 interconnecting the network 22 with the tie trunk interface circuit 24 is nonexistent. This is due to the fact that while the network crosspoint connection HM-1 is closed, the make contacts DS-1 and RV-1 are open since relays DS and RV are not operated during this stage of the call.

When the called party 60 goes off-hook (i.e., answers), battery is reversed by the distant PBX 50 on the tip and ring leads 54 and is delivered into the tie trunk interface circuit 24.

As previously discussed in the prior art approach of FIG. 2, the battery reversal indication circuit 67 detects battery reversal and operates relay DS to close make contacts DS-1. With contacts DS-1 closed, an electrical path is established beginning with a minus 48 volt potential in the tie trunk interface circuit 24 which is delivered through the coil of relay RV, through the now closed relay contacts DS-1, over the sleeve lead S of leads 35, through the network crosspoint connection of HM-1, through the network crosspoint connection of HM-2, over sleeve lead S of leads 38 and to the bifurcated branch connection of SL and resistor 72 and thence to ground.

The above electrical path from minus 48 volts to ground causes current to flow in the coil of relay RV thereby operating relay RV to close make contacts RV-1. With contacts RV-1 closed, the relay RV is held operated to ground. In this manner, relay DS may release without effecting the loss of current in the coil of relay RV. It is important to note at this time, an additional resistance 80 is in parallel with the coils of RV in order to increase the amount of the current I5 in sleeve lead S. The value of current I5 in sleeve lead S of leads 35 is essential to the operation of this invention as will become more apparent in the ensuing discussion.

At this stage of the call, the called station 60 has gone off-hook in response to ringing thereby causing the relay RV to operate and to cause the current I5 to flow. The current I5 increases the value of current I3 by an amount equal to I5 as shown in the current node equation at node 64:

$$I3 = I4 + I5.$$

Therefore,
$$I1 + I2 = I5 + I4.$$

This means that current I1 and current I2 proportionately increase together by an accumulative amount of I5. The respective increase in current I1 is sufficient to bring the current flowing through the coil of relay SL over the value of the current required to operate relay SL. Relay SL operates upon the appearance of current I5 to close make contacts SL-2 and to open break contacts SL-1. With contacts SL-2 closed, the signal lamp 48 now receives its power from direct current source 44 and provides a steady illumination to the attendant.

In accordance with our invention, when the called station 60 goes off-hook, an additional current I5 is provided in the sleeve lead path S of the local PBX 20 which increases the current flowing through relay SL to a value which effects relay SL to operate. Relay S1 operated conveys a signal to the attendant that the called station 60 has answered.

The above described invention of FIG. 3 and the prior art arrangements of FIG. 2 find application in direct termination PBXs. That is PBXs in which, at a given time, only one of the several attendant's consoles has direct access to a given tie trunk call. Many modern PBXs have shared loop access wherein each attendant's console has access through a network to each tie trunk call. The above invention may be readily adapted by one skilled in the art to find application in a shared loop PBX wherein the attendant serving the call would not be dropped from the loop until the called party answers.

What is claimed is:

1. In a telephone switching system having a local PBX, a distant PBX, tie trunks interconnecting said local PBX with said distant PBX, an attendant's console having a plurality of lamps at said local PBX, a matrix type switching network in said local PBX, tie trunk circuitry connected to one side of said network and attendant console control circuitry connected to another side of said network, means for extending a call over one of said tie trunks from said local PBX to a called station in said distant PBX, said local PBX further having a return answer supervisory circuit comprising:

means responsive to said extension for signaling one of said lamps on said attendant's console in a first unique code,
means responsive to the answering of said call by said called station for transmitting an attendant lamp control signal from said tie trunk circuit through said network to said attendant console control circuitry, and
means responsible to said transmitted signal for signaling said lamp in a second unique code.

2. The system of claim 1:
in which said means for signaling said lamp in a first unique code comprises a relay having make contacts and break contacts and a power source for delivering power according to said first unique code through said break contacts to said lamp; and
in which said means for signaling said lamp in a second unique code comprises a power source for delivering power according to said second unique code through said make contacts to said lamp when said relay is operated, said relay being operated when said called station in said distant PBX answers.

3. The system of claim 1 in which said tie trunk comprises tip and ring leads and said answer condition is a reversal of battery polarity on said tip and ring leads when said called station answers.

4. The system of claim 3:
in which said means for signaling said lamp in a first unique code comprises a relay having make contacts and break contacts and an intermittent power source for delivering intermittent power through said break contacts to said lamp when said relay is released; and in which said means for signaling said lamp in a second unique code comprises a direct current power source for delivering direct current power through said make contacts when said relay is operated in response to said battery polarity reversal condition.

5. In a telephone switching system having a local PBX, a distant PBX, tie trunks interconnecting said local PBX with said distant PBX, said local PBX having an attendant's console with a plurality of lamps, central office trunk circuits, a switching network, and an interface circuit, said distant PBX having a plurality of stations, means in said local PBX for detecting the receipt of a call appearing on one of said central office trunk circuits and requiring access to a called one of said stations in said distant PBX, means including said attendant's console for establishing a path including a sleeve lead path from said one central office trunk circuit through said network to said interface circuit, and said local PBX further having a return answer supervisory circuit comprising:

means in said one central office trunk circuit responsive to the establishment of said sleeve lead path for signaling one of said lamps in said attendant's console in a first unique code,
means in said interface circuit interconnected with the called station in said distant PBX over said tie trunk circuit for detecting when said called station answers, and
means responsive to said answer detection for signaling said lamp in a second unique code.

6. The system of claim 5 in which said means for signaling comprises:
a relay having make contacts and break contacts,
means responsive to said answer detection for operating said relay,
a first power source for delivering power according to said first unique code through said break contacts to said lamp when said relay is released, and
a second power source for delivering power according to said second unique code through said make contacts to said lamp when said relay is operated.

7. A switching system comprising:
a local PBX,
a distant PBX having a plurality of stations,
a tie trunk interconnecting said PBXs,
a tie trunk circuit connected to said tie trunk at said local PBX,
an attendant console at said local PBX,
a central office connected to said local PBX via a central office trunk circuit,
a switching network in said local PBX,
means in said local PBX for detecting the receipt by said central office trunk circuit of a call from said central office requiring a connection to a called station at said distant PBX, means including said attendant console for establishing a network path between said central office trunk circuit and said tie trunk circuit,
means effective upon said path establishment for extending said call over said tie trunk to said distant PBX,
means in said local PBX responsive to the establishment of said network path for displaying a first signal at said attendant console,
means in said local PBX for detecting an off hook state of the called station at distant PBX, and means responsive to said detection for displaying a second signal at said attendant console.

8. In a PBX having central office trunk circuits, interface tie trunk circuits, a switching network, common control equipment, and an attendant's console having a plurality of lamps, means including said common control equipment and said attendant's console effective upon the receipt of an incoming call by one of said central office trunk circuits for establishing a network connection from said one central office trunk circuit to an idle one of said interface tie trunk circuits, said one interface tie trunk circuit being interconnected with a called station located in a distant PBX in response to said network connection, means in said one central office trunk circuit for signaling one of said lamps in a first unique code upon the establishment of said network connection, and means in said interface tie trunk circuit responsive to an answer signal from said called station for maintaining the tie trunk connection to said called station, and improvement comprising:
first means responsive to said network connection for inhibiting the provision of a second unique code signal by said signaling means to said lamp,
second means responsive to said network connection for signaling said lamp in a first unique code, and
means interconnected with said first means responsive to said tie trunk maintenance for enabling said signaling means to signal said lamp in said second unique code and for inhibiting said second means.

9. The system of claim 8:
wherein said signaling means for signaling said lamp in said second unique code comprises a relay having make contacts and a second power source for delivering power according to said second unique code through said make contacts to said lamp when said relay is operated; and
wherein said inhibiting means comprises means responsive to said network connection for shunting said relay so that said relay remains released.

10. The system of claim 9 wherein said second means comprises:
break contacts in said relay, and
a second power source for delivering power according to said second unique code through said break contacts to said lamp when said relay is released.

11. The system of claim 10 wherein said enabling means comprises:
a current source, and
means responsive to said tie trunk maintenance for connecting said current source to said relay so that said relay operates.

12. A method for providing return answer supervision in a PBX having central office trunk circuits, a network, interface tie trunk circuits, common control equipment, and an attendant's console with a plurality of lamps, said common control equipment being controlled by said attendant's console upon the receipt of a call on one of said central office trunk circuits for establishing a connection in said network from said one central office trunk circuit to an idle one of said interface tie trunk circuits, said one interface tie trunk being interconnected with a called station located in a distant PBX in response to said network connection, means in said one central office trunk circuit for signaling one of said lamps in a first unique code upon the establishment of said network connection, and means in said interface tie trunk circuit responsive to an answer signal from said called station for maintaining the tie trunk connection to said called station, said method comprising the steps of:
inhibiting the provision of a second unique code signal by said signaling means to said one lamp in response to said network connection,
signaling said one lamp according to a first unique code in response to said network connection,
inhibiting the provision of the first unique code signal to said one lamp in response to said tie trunk maintenance, an
enabling the provision of the second unique code signal by said signaling means to said one lamp in response to the inhibiting of said first signal.

13. The method of operating a PBX having central office trunk circuits, a switching network, interface tie trunk circuits, common control equipment, and an attendant's console with a plurality of lamps, said method comprising the steps of:
detecting the receipt by one of said central office trunk circuits of a call that requires a connection to a called station in a distant PBX,
establishing under control of said attendant's console a network connection from said one central office trunk circuit to an idle one of said interface tie trunk circuits,
shunting the coil of a relay in response to said network connection so that said relay is prevented from operating, said relay being provided for signaling one of said lamps through make contacts of said relay in a second unique code upon the answering of said call at said distant PBX,
signaling said one lamp according to a first unique code through break contacts of said relay in response to said network connection,
supplying current to the coil of said relay in response to an answer signal from said distant PBX on said one interface tie trunk circuit so that said relay operates, and
signaling said one lamp according to said second code when said relay operates.

* * * * *